UNITED STATES PATENT OFFICE.

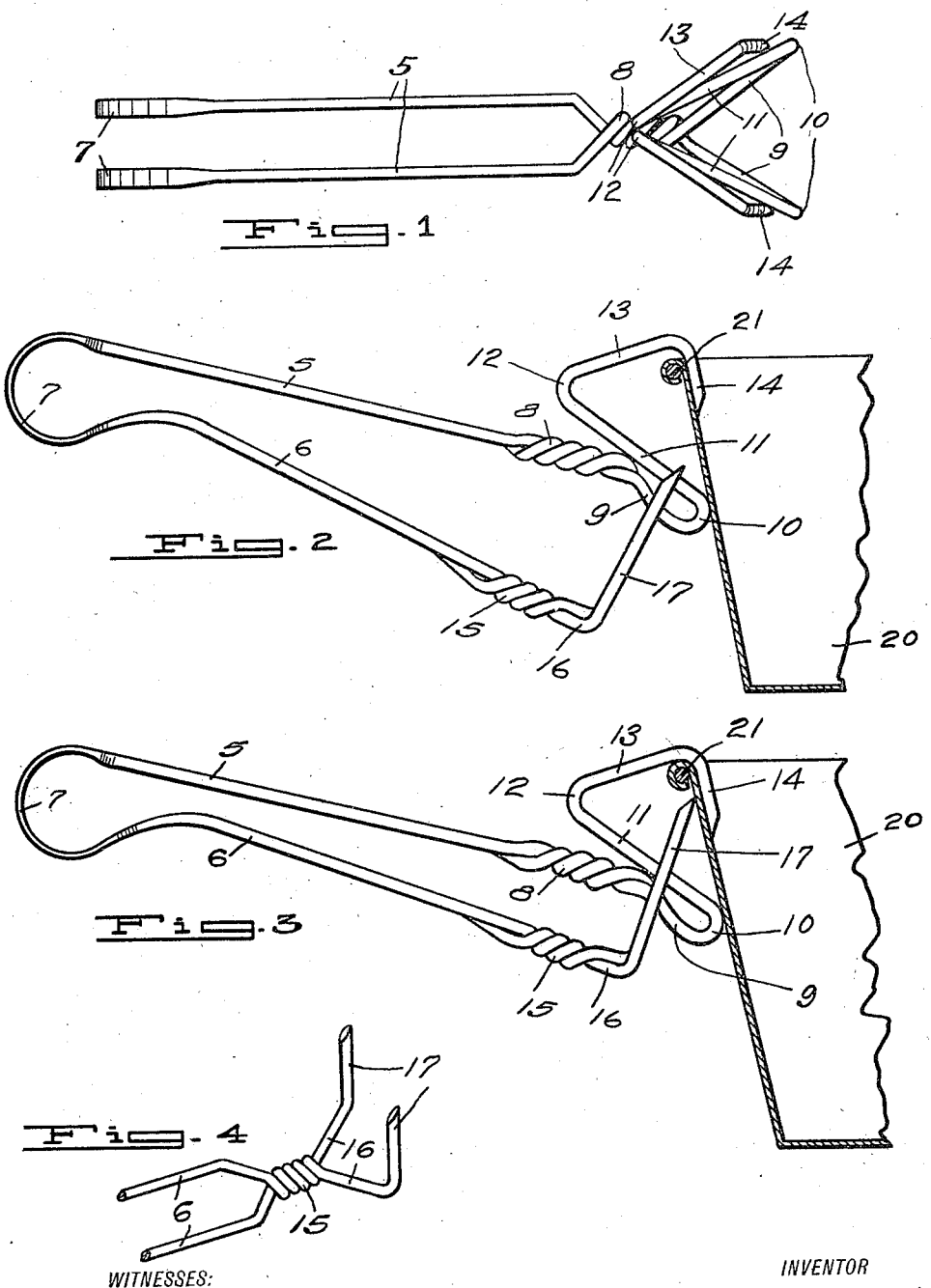

BERNARD E. DOUGHERTY, OF SEATTLE, WASHINGTON.

KITCHEN UTENSIL.

1,293,379.

Specification of Letters Patent.

Patented Feb. 4, 1919.

Application filed July 18, 1916, Serial No. 109,988. Renewed December 23, 1918. Serial No. 268,098.

*To all whom it may concern:*

Be it known that I, BERNARD E. DOUGHERTY, a citizen of the United States, residing at Seattle, in the county of King and State of Washington, have invented a new and useful Improvement in Kitchen Utensils, of which the following is a specification.

This invention relates to improvements in kitchen utensils and the object of this improvement is to provide a tong-like device that may be used to firmly grasp the edge of heated cooking vessels, pots, pans, kettles and the like whereby such cooking vessels may be handled without danger of dropping or of burning the hands. In this capacity the device performs the function of a detachable handle that may be instantly applied to cooking vessels of various conformations.

The invention consists in the novel construction, adaptation and combination of parts of a pot holder, as will be more clearly described in the following specification, illustrated in the accompanying drawings and finally pointed out in the appended claims.

In the accompanying drawings Figure 1 is a plan view of a device constructed in accordance with this invention; Fig. 2 is a view in side elevation of the same as it may appear in the first operation of taking hold of a pan; Fig. 3 is a view in side elevation of the device as it may appear after the pan has been grasped, and Fig. 4 is a fragmentary detail in perspective of a portion of the device.

Referring to the drawings throughout which like reference numerals indicate like parts, the numeral 5 indicates two wires that form the top elements of a handle and 6 indicates two other portions of the same wires that form the bottom elements of the same handle, the elements 5 and 6 being connected at the outer end of the handle by flattened curved portions 7 that form integral springs and normally hold the handle elements in the position shown in Fig. 2 in which position they are suitably disposed to form a handle that may be grasped securely within the hand of the user.

The inner ends of the handle members 5 are twisted tightly together for a short distance as at 8 thence diverge and form the branches 9 that extend forward a short distance and are then doubled backward on themselves to form knees or supports 10.

From the knees 10 the wires converge and extend rearward as at 11 to the points 12 where they are doubled forward in diverging portions 13 that terminate in downturned grasping elements 14.

The portions 6 are securely twisted together as at 15 thence diverge and extend forward as at 16 and terminate in upwardly directed pan engaging elements 17, see Fig. 4, that are normally in opposition to the downturned grasping elements 14.

The device when formed in the above described manner is made of two pieces of wire of equal lengths, is cheap and simple to construct and forms a strong and durable utensil that automatically adjusts itself to, and securely grasps almost anything in the line of pots, pans and the like that are used in the kitchen.

In operation the device is grasped in the hand, the downturned elements 14 are hooked into and over the top edge of a pan 20, as shown in Fig. 2, and a squeezing pressure is exerted on the handle elements 5 and 6 to bring the elements 17 into engagement with the outside of the pan 20 in opposition to the elements 14, as shown in Fig. 3. The pan is thus securely held by the tong-like action of the elements 14 and the elements 17 and rests against and is steadied by the knee supports 10.

Pots, pans and the like are generally constructed with some form of flange or bead 21 around the top portion thereof which normally lies within the arched portion of the holder formed by the parts, 11, 12 and 13, and insures that the lifting device will not slip off after engagement with the pan is effected. This bead, however, is not necessary to the successful operation of the device since it is found in practice that a fairly heavy pan having no bead or flange on the top edge thereof may be securely held by the exertion of a relatively slight grip on the handle elements 5 and 6.

The knees 10 are an important element in this device since they are spaced apart and perform the function of braces against which the side of the pan may rest, and engage equally well with either a curved or a straight wall, thus adapting the device for use on either round or rectangular pans.

The device is preferably constructed of steel wire of a size suited to the weight of the work it is designed to perform, the steel wire giving sufficient strength for all ordinary purposes and at the same time affording a resiliency that permits the device to adapt itself to vessels of different conformation.

What I claim and desire to protect by Letters Patent is:

1. A pot holder having a handle consisting in spaced upper and lower handle elements connected at their outer ends by an integrally formed arcuate spring member, two arched members on the inner end of said upper handle element, said arched members being spaced apart and terminating in downwardly directed portions adapted to engage within a pot, two fixed knees disposed to engage the outside of a pot below said downwardly directed portions, and two upwardly directed members on the inner end of said lower handle element and adapted to engage the outside flange of a pot adjacent the downwardly directed portions.

2. A pot holder composed of spring wire that is bent to form a handle consisting in spaced upper and lower handle elements connected on their outer ends by integrally formed arcuate springs, said lower handle elements being converged and secured together near the inner ends thereof and thence diverged and bent upwardly to form pot engaging elements, and said upper handle elements being converged and secured together near their inner ends, thence diverged and extended forwardly to form pot engaging knees and thence arched rearwardly and upwardly and provided with downwardly directed pot engaging elements.

Signed by me at Seattle, Washington, this 1st day of July, 1916.

BERNARD E. DOUGHERTY.

Witnesses:
 HOWARD G. COSGROVE,
 ERNEST B. HERALD.

Copies of this patent may be obtained for five cents each, by addressing the "Commissioner of Patents, Washington, D. C."